United States Patent
Bucknor et al.

(10) Patent No.: US 6,712,732 B1
(45) Date of Patent: Mar. 30, 2004

(54) FAMILY OF MULTI-SPEED PLANETARY TRANSMISSIONS EACH HAVING TWO INPUT CLUTCHES AND THREE PLANETARY GEARSETS

(75) Inventors: Norman Kenneth Bucknor, Troy, MI (US); Madhusudan Raghavan, West Bloomfield, CT (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 13 days.

(21) Appl. No.: 10/243,606

(22) Filed: Sep. 13, 2002

(51) Int. Cl.$^7$ ............................................... F16H 3/62
(52) U.S. Cl. ......................................................... 475/275
(58) Field of Search ............................................. 475/275

(56) References Cited

U.S. PATENT DOCUMENTS

| | | | | |
|---|---|---|---|---|
| 4,070,927 A | 1/1978 | Polak | ........................ | 74/765 |
| 4,709,594 A | 12/1987 | Maeda | ........................ | 74/753 |
| 5,106,352 A | 4/1992 | Lepelletier | ................... | 475/280 |
| 5,599,251 A | 2/1997 | Beim et al. | ................... | 475/275 |
| 6,053,839 A | 4/2000 | Baldwin et al. | ............... | 475/281 |
| 6,071,208 A | 6/2000 | Koivunen | ..................... | 475/275 |
| 6,083,135 A | 7/2000 | Baldwin et al. | ............... | 475/276 |
| 6,217,474 B1 | 4/2001 | Ross et al. | ..................... | 475/269 |
| 6,530,858 B1 * | 3/2003 | Usoro et al. | .................. | 475/276 |
| 6,589,129 B2 * | 7/2003 | Usoro et al. | .................. | 475/275 |
| 6,645,116 B1 * | 11/2003 | Usoro et al. | .................. | 475/276 |
| 6,648,791 B2 * | 11/2003 | Kao et al. | ..................... | 475/296 |
| 2002/0115522 A1 * | 8/2002 | Raghavan et al. | ............ | 475/276 |
| 2002/0183160 A1 * | 12/2002 | Kao et al. | ..................... | 475/269 |

FOREIGN PATENT DOCUMENTS

| | | |
|---|---|---|
| EP | 1033510 | 6/2000 |
| JP | 9-126283 | 5/1997 |

* cited by examiner

*Primary Examiner*—Dirk Wright
(74) *Attorney, Agent, or Firm*—Kathryn A. Marra

(57) ABSTRACT

A family of transmissions employing three planetary gearsets and five torque-transmitting mechanisms provides at least six forward speed ratios and one reverse speed ratio when the torque-transmitting mechanisms are engaged in combinations of three. Three interconnecting members continuously interconnect six members of the planetary gear sets. The output shaft is continuously interconnected with at least one member of the planetary gear sets, and the input shaft is not continuously interconnected with any member of the planetary gear sets. The torque-transmitting mechanisms consist of both selectively engageable rotating type torque-transmitting mechanisms and selectively engageable stationary type torque-transmitting mechanisms.

7 Claims, 9 Drawing Sheets

| | RATIOS | 56 | 58 | 50 | 52 | 54 |
|---|---|---|---|---|---|---|
| REVERSE | -2.83 | X | X | X | | |
| NEUTRAL | 0 | X | | X | | |
| 1 | 3.20 | X | | X | | X |
| 2 | 2.00 | X | | | X | X |
| 3 | 1.40 | X | | X | X | |
| 4 | 1.00 | | | X | X | X |
| 5 | 0.68 | | X | X | X | |
| 6 | 0.54 | | X | | X | X |

(X=engaged)

Ring Gear/Sun Gear Tooth Ratios: $\frac{R1}{S1}=2.47, \frac{R2}{S2}=2.01, \frac{R3}{S3}=1.67$

| Ratio Spread | 5.88 |
|---|---|
| Ratio Steps | |
| REV/1 | -0.88 |
| 1/2 | 1.60 |
| 2/3 | 1.42 |
| 3/4 | 1.40 |
| 4/5 | 1.48 |
| 5/6 | 1.24 |

| | RATIOS | 156 | 158 | 150 | 152 | 154 |
|---|---|---|---|---|---|---|
| REVERSE | -2.20 | X | | | X | X |
| NEUTRAL | 0 | | | | X | X |
| 1 | 2.37 | | X | | X | X |
| 2 | 1.43 | | X | X | | X |
| 3 | 1.00 | | | X | X | X |
| 4 | 0.72 | | X | X | X | |
| 5 | 0.50 | X | | X | X | |
| 6 | 0.41 | X | X | X | | |

( X=engaged )

Ring Gear/Sun Gear Tooth Ratios: $\frac{R1}{S1}=2.44, \frac{R2}{S2}=1.50, \frac{R3}{S3}=2.33$

| Ratio Spread | 5.75 |
|---|---|
| Ratio Steps | |
| REV/1 | -0.93 |
| 1/2 | 1.66 |
| 2/3 | 1.43 |
| 3/4 | 1.39 |
| 4/5 | 1.42 |
| 5/6 | 1.23 |

| | RATIOS | 256 | 258 | 250 | 252 | 254 |
|---|---|---|---|---|---|---|
| REVERSE | -1.53 | X | | X | | X |
| NEUTRAL | 0 | | | X | | X |
| 1 | 2.37 | | X | X | | X |
| 2 | 1.54 | | X | | X | X |
| 3 | 1.00 | | | X | X | X |
| 4 | 0.75 | | X | X | X | |
| 5 | 0.51 | X | | X | X | |
| 6 | 0.38 | X | X | | X | |

(X=engaged)

Ring Gear/Sun Gear Tooth Ratios: $\frac{R1}{S1}=1.86, \frac{R2}{S2}=3.00, \frac{R3}{S3}=1.85$

| Ratio Spread | 6.16 |
|---|---|
| Ratio Steps | |
| REV/1 | -0.65 |
| 1/2 | 1.54 |
| 2/3 | 1.54 |
| 3/4 | 1.33 |
| 4/5 | 1.46 |
| 5/6 | 1.33 |

| | RATIOS | 356 | 358 | 350 | 352 | 354 |
|---|---|---|---|---|---|---|
| REVERSE | -1.53 | X | | X | | X |
| NEUTRAL | 0 | | | X | | X |
| 1 | 2.37 | | X | X | | X |
| 2 | 1.54 | | X | | X | X |
| 3 | 1.00 | | | X | X | X |
| 4 | 0.75 | | X | X | X | |
| 5 | 0.51 | X | | X | X | |
| 6 | 0.38 | X | X | | X | |

(X=engaged)

Ring Gear/Sun Gear Tooth Ratios: $\frac{R1}{S1}=1.86, \frac{R2}{S2}=3.00, \frac{R3}{S3}=1.85$

| Ratio Spread | 6.16 |
|---|---|
| Ratio Steps | |
| REV/1 | -0.65 |
| 1/2 | 1.54 |
| 2/3 | 1.54 |
| 3/4 | 1.33 |
| 4/5 | 1.46 |
| 5/6 | 1.33 |

| | RATIOS | 456 | 458 | 450 | 452 | 454 |
|---|---|---|---|---|---|---|
| REVERSE | -2.08 | X | X | | X | |
| NEUTRAL | 0 | X | | | X | |
| 1 | 3.47 | X | | | X | X |
| 2 | 2.15 | X | | X | | X |
| 3 | 1.32 | X | | X | X | |
| 4 | 1.00 | | | X | X | X |
| 5 | 0.72 | | X | X | X | |
| 6 | 0.53 | | X | X | | X |

(X=engaged)

Ring Gear/Sun Gear Tooth Ratios: $\frac{R1}{S1}=2.5, \frac{R2}{S2}=1.63, \frac{R3}{S3}=1.67$

| Ratio Spread | 6.50 |
|---|---|
| Ratio Steps | |
| REV/1 | -0.60 |
| 1/2 | 1.61 |
| 2/3 | 1.63 |
| 3/4 | 1.32 |
| 4/5 | 1.39 |
| 5/6 | 1.34 |

|  | RATIOS | 556 | 558 | 550 | 552 | 554 |
|---|---|---|---|---|---|---|
| REVERSE | -2.08 | X | X |  | X |  |
| NEUTRAL | 0 | X |  |  | X |  |
| 1 | 3.47 | X |  |  | X | X |
| 2 | 2.15 | X |  | X |  | X |
| 3 | 1.32 | X |  | X | X |  |
| 4 | 1.00 |  |  | X | X | X |
| 5 | 0.72 |  | X | X | X |  |
| 6 | 0.53 |  | X | X |  | X |

(X=engaged)

Ring Gear/Sun Gear Tooth Ratios: $\frac{R1}{S1}=2.5$, $\frac{R2}{S2}=1.63$, $\frac{R3}{S3}=1.67$

| Ratio Spread | 6.50 |
|---|---|
| Ratio Steps |  |
| REV/1 | -0.60 |
| 1/2 | 1.61 |
| 2/3 | 1.63 |
| 3/4 | 1.32 |
| 4/5 | 1.39 |
| 5/6 | 1.34 |

|  | RATIOS | 656 | 658 | 650 | 652 | 654 |
|---|---|---|---|---|---|---|
| REVERSE | -2.65 | X | X |  | X |  |
| NEUTRAL | 0 |  | X |  | X |  |
| 1 | 3.66 |  | X |  | X | X |
| 2 | 2.21 |  | X | X |  | X |
| 3 | 1.43 |  | X | X | X |  |
| 4 | 1.00 |  |  | X | X | X |
| 5 | 0.69 | X |  | X | X |  |
| 6 | 0.54 | X |  | X |  | X |

(X=engaged)

Ring Gear/Sun Gear Tooth Ratios: $\frac{R1}{S1} = 1.86, \frac{R2}{S2} = 2.50, \frac{R3}{S3} = 2.33$

| Ratio Spread | 6.71 |
|---|---|
| Ratio Steps |  |
| REV/1 | -0.72 |
| 1/2 | 1.66 |
| 2/3 | 1.55 |
| 3/4 | 1.43 |
| 4/5 | 1.45 |
| 5/6 | 1.26 |

| | RATIOS | 756 | 758 | 750 | 752 | 754 |
|---|---|---|---|---|---|---|
| REVERSE | -2.49 | X | X | | X | |
| NEUTRAL | 0 | X | | | X | |
| 1 | 3.28 | X | | | X | X |
| 2 | 2.01 | X | | X | | X |
| 3 | 1.33 | X | | X | X | |
| 4 | 1.00 | | | X | X | X |
| 5 | 0.72 | | X | X | X | |
| 6 | 0.56 | | X | X | | X |

(X=engaged)

Ring Gear/Sun Gear Tooth Ratios: $\frac{R1}{S1} = 1.85$, $\frac{R2}{S2} = 3.00$, $\frac{R3}{S3} = 1.59$

| Ratio Spread | 5.90 |
|---|---|
| Ratio Steps | |
| REV/1 | -0.76 |
| 1/2 | 1.63 |
| 2/3 | 1.51 |
| 3/4 | 1.33 |
| 4/5 | 1.40 |
| 5/6 | 1.29 |

| | RATIOS | 856 | 858 | 850 | 852 | 854 |
|---|---|---|---|---|---|---|
| REVERSE | -2.20 | X | | | X | X |
| NEUTRAL | 0 | | | | X | X |
| 1 | 2.37 | | X | | X | X |
| 2 | 1.43 | | X | X | | X |
| 3 | 1.00 | | | X | X | X |
| 4 | 0.79 | | X | X | X | |
| 5 | 0.61 | X | | X | X | |
| 6 | 0.48 | X | X | X | | |

( X=engaged )

Ring Gear/Sun Gear Tooth Ratios: $\frac{R1}{S1} = 3.00, \frac{R2}{S2} = 1.50, \frac{R3}{S3} = 2.33$

| Ratio Spread | 5.75 |
|---|---|
| Ratio Steps | |
| REV/1 | -0.93 |
| 1/2 | 1.66 |
| 2/3 | 1.43 |
| 3/4 | 1.27 |
| 4/5 | 1.29 |
| 5/6 | 1.27 |

6,712,732 B1

FAMILY OF MULTI-SPEED PLANETARY TRANSMISSIONS EACH HAVING TWO INPUT CLUTCHES AND THREE PLANETARY GEARSETS

TECHNICAL FIELD

This invention relates to multi-speed planetary transmissions having three planetary gearsets and five torque-transmitting mechanisms that are selectively engageable in combinations of three to provide at least six forward speeds and one reverse speed.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; U.S. Pat. No. 5,599,251 issued to Beim and McCarrick on Feb. 4, 1997, U.S. Pat. No. 6,083,135 issued to Baldwin et al. on Jul. 4, 2000, and European Patent Application No. EP 1 033 510 A1 published Jun. 9, 2000.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier and the EP publications each employ three planetary gearsets, three clutches and two brakes to provide six forward speed ratios and one reverse ratio. One of the planetary gearsets in each of these publications is positioned and operated to establish two fixed speed input members for the remaining two planetary gearsets.

SUMMARY OF THE INVENTION

It is an object of the present invention to provide an improved multi-speed planetary transmission having three planetary gearsets and five torque-transmitting mechanisms.

In one aspect of the present invention, each of the family members has three planetary gearsets and each planetary gearset has three members.

In another aspect of the present invention, the three planetary gear members are either a sun gear member, a ring gear member, or a planet carrier assembly member.

In yet another aspect of the present invention, the five torque-transmitting mechanisms are composed of three rotating type torque-transmitting mechanisms and two stationary type torque-transmitting In still another aspect of the present invention, each of the family members has three interconnecting members that are effective to continuously interconnect members of the planetary gearsets.

In yet still another aspect of the present invention, a first of the interconnecting members connects a first member of the first planetary gearset with a first member of the second planetary gearset, a second of the fixed interconnecting members continuously interconnects a second member of the second planetary gearset with a first member of the third planetary gearset, and a third of the interconnecting members continuously interconnects a second member of the first planetary gearset with a second member of the third planetary gearset.

In a further aspect of the present invention, an output shaft is continuously connected with at least one member of one of the planetary gearsets.

In yet a further aspect of the present invention, an input shaft for each transmission family member is selectively connectible with the planetary gearsets through a first and second of the rotating torque-transmitting mechanisms.

In yet still a further aspect of the present invention, a third of the rotating torque-transmitting mechanisms selectively interconnects a member of one of the planetary gearsets with one of the input shaft, the output shaft, or another member of one of the planetary gearsets.

In yet a still further aspect of the present invention, the torque-transmitting mechanisms are selectively engaged in combinations of three to provide at least six forward speed ratios and one reverse speed ratio between the input shaft and the output shaft.

Each of the family members, as set forth above in the aspects and object of this invention, have interconnected members and at least one member continuously connected with the output shaft. In each of the family members, at least one of the planetary members of two of the planetary gearsets is non-continuously connected with any other planetary member within the gearsets except for meshing relationships, which are required. In many of the family members, the input shaft is selectively engaged with one of the non-continuously interconnected members through one of the selectively engageable torque-transmitting mechanisms and is selectively engaged with one of the interconnecting members through another of the selectively engageable torque-transmitting mechanisms. In other of the family members, the input shaft is selectively connected to the non-continuously connected members through the two torque-transmitting mechanisms.

DESCRIPTION OF THE EXEMPLARY EMBODIMENT

Figures 1, 2:
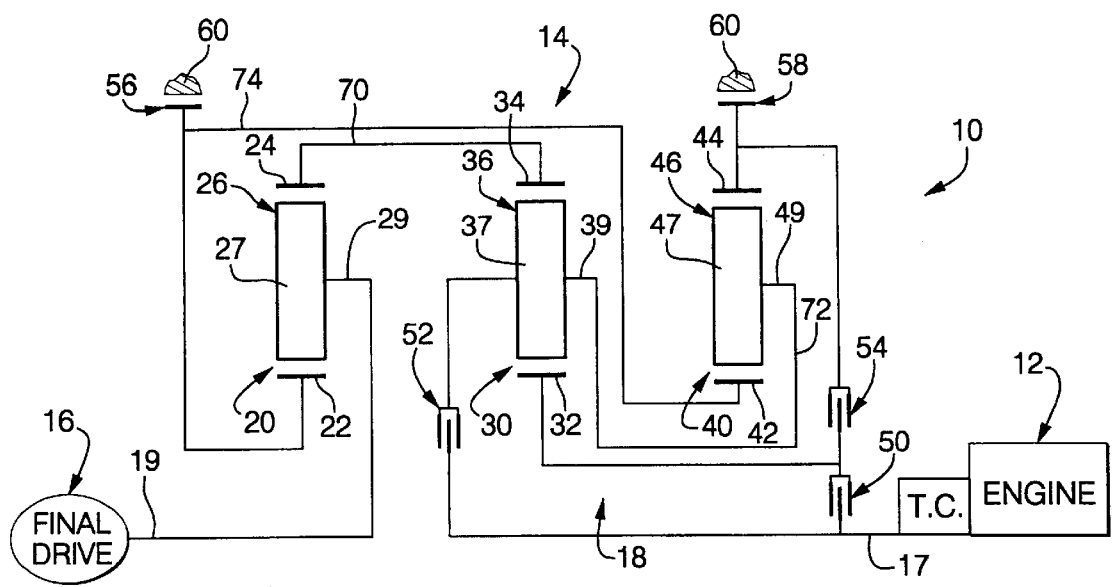
FIG. 1 is a schematic representation of a powertrain having included therein a planetary arrangement incorporating one of the family members of the present invention.
FIG. 2 is a truth table and chart depicting some of the operating characteristics of the planetary arrangement shown in FIG. 1.

Referring to the drawings, wherein like characters represent the same or corresponding parts throughout the several views, there is seen in FIG. 1 a powertrain 10 having a conventional engine and torque converter 12, a planetary transmission 14, and a conventional final drive mechanism 16. The planetary transmission 14 includes an input shaft 17, a planetary gear arrangement 18, and an output shaft 19. The input shaft 17 is continuously connected with the engine and torque converter 12, and the output shaft 19 is continuously connected with the final drive mechanism 16.

The planetary gear arrangement 18 includes three planetary gearsets 20, 30, and 40, and five torque-transmitting mechanisms 50, 52, 54, 56, and 58. The torque-transmitting mechanisms 50, 52, and 54 are of the rotating type torque-transmitting mechanisms, commonly termed clutches. The torque-transmitting mechanisms 56 and 58 are of the stationary type torque-transmitting mechanisms, commonly termed brakes. These torque-transmitting mechanisms are selectively engageable fluid-operated devices that are well known in the art of power transmissions.

The planetary gearset 20 includes a sun gear member 22, a ring gear member 24, and a planet carrier assembly member 26. The planet carrier assembly member 26 includes a plurality of pinion gears 27 that are rotatably mounted on a planet carrier 29 and disposed in meshing relationship with the sun gear member 22 and the ring gear member 24.

The planetary gearset 30 includes a sun gear member 32, a ring gear member 34, and a planet carrier assembly member 36. The planet carrier assembly member 36 includes a plurality of pinion gears 37 that are rotatably mounted on a planet carrier 39 and disposed in meshing relationship with the sun gear member 32 and the ring gear member 34.

The planetary gearset 40 includes a sun gear member 42, a ring gear member 44, and a planet carrier assembly member 46. The planet carrier assembly member 46 includes a plurality of pinion gears 47 that are rotatably mounted on a planet carrier 49 and disposed in meshing relationship with the sun gear member 42 and the ring gear member 44.

Each of these planetary gearsets 20, 30, and 40 are commonly termed simple or single-pinion planetary gearsets in that each pinion gear meshes with both the sun gear member and the ring gear member. This is contrasted with planetary gearsets commonly termed double-pinion or compound planetary gearsets, wherein a plurality of pairs of intermeshing pinions mesh with the sun gear member and ring gear member, respectively. It will be seen later that some of the family members incorporate double-pinion type planetary gearsets.

The ring gear member 24 is continuously connected with the ring gear member 34 through an interconnecting member 70. The planet carrier assembly member 36 and the planet carrier assembly member 46 are continuously interconnected with an interconnecting member 72. The sun gear member 22 and sun gear member 42 are continuously interconnected with an interconnecting member 74. The planet carrier assembly member 26 is continuously connected with the output shaft 19. The input shaft 17 is selectively connectible with the sun gear member 32 through the torque-transmitting mechanism 50, and selectively connectible with the interconnecting member 72 through the torque-transmitting mechanism 52. The sun gear member 32 is selectively connectible with the ring gear member 44 through the torque-transmitting mechanism 54. The interconnecting member 74 is selectively connectible with a transmission housing 60 through the torque-transmitting mechanism 56. The ring gear member 44 is selectively connectible with the transmission housing 60 through the torque-transmitting mechanism 58. It should be noted that the sun gear member 32 and the ring gear member 44 are not continuously connected with members of the other planetary gearsets. However, they are selectively interconnectible through the respective torque-transmitting mechanisms 58, 54, and 50.

The truth table shown in FIG. 2 provides a depiction of the engagement combinations and sequence for the torque-transmitting mechanisms. As noted in the truth table, the torque-transmitting mechanisms are engaged in combinations of three to provide a reverse speed ratio and six forward speed ratios.

The reverse speed ratio is established with the engagement of the torque-transmitting mechanisms 50, 56, and 58. With this combination of engagements, the planet carrier assembly member 36 and the sun gear member 22 are held stationary and the sun gear member 32 is selectively connected with the input shaft 17. The ring gear members 34 and 24 are driven at a speed- determined by the speed of the sun gear member 32 and the ring gear/sun gear tooth ratio of the planetary gearset 30. The planet carrier assembly member 26 and therefore output shaft 19 are driven at a speed determined by the speed of the ring gear member 24 and the ring gear/sun gear tooth ratio of the planetary gearset 20. The numerical value of the reverse speed ratio is determined by the ring gear/sun gear tooth ratios of the planetary gearsets 20 and 30.

The first forward speed ratio is established with the engagement of the torque-transmitting mechanisms 50, 54, and 56. During the first forward speed ratio, the planet carrier assembly member 36 and 46 are driven at a speed determined by the speed of the ring gear member 44. The ring gear members 34 and 24 are driven at a speed determined by the speed of the sun gear member 32, the speed of the planet carrier assembly member 36, and the ring gear/sun gear tooth ratio of the planetary gearset 30. The planet carrier assembly member 26 and therefore output shaft 19 are driven at a speed determined by the speed of the ring gear member 24 and the ring gear/sun gear tooth ratio of the planetary gearset 20. The numerical value of the first forward speed ratio is determined by the ring gear/sun gear tooth ratios of the planetary gearsets 20, 30, and 40.

The second forward speed ratio is established with the engagement of the torque-transmitting mechanisms 52, 54, and 56. During the second forward speed ratio, the speed of the ring gear member 44 and the sun gear member 32 is determined by the speed of the planet carrier assembly member 46 and the ring gear/sun gear tooth ratio of the planetary gearset 40. The speed of the ring gear member 34 and ring gear member 24 are determined by the speed of the planet carrier assembly member 36, the speed of the sun gear member 32, and the ring gear/sun gear tooth ratio of the planetary gearset 30. The speed of the output shaft 19 and planet carrier assembly member 26 are determined by the speed of the ring gear member 24 and the ring gear/sun gear tooth ratio of the planetary gearset 20. The numerical value of the second forward speed ratio is determined by the ring gear/sun gear tooth ratios of all three planetary gearsets 20, 30, and 40.

The third forward speed ratio is established with the engagement of the torque-transmitting mechanisms 50, 52, and 56. During the third forward speed ratio, the planetary gearset 30 and the ring gear member 24 are driven at the speed of the input shaft 17. The planet carrier assembly member 26 and output shaft 19 are driven forwardly at a speed determined by the speed of the ring gear member 24 and the ring gear/sun gear tooth ratio of the planetary gearset 20. The numerical value of the third forward speed ratio is determined by the ring gear/sun gear tooth ratio of the planetary gearset 20.

The fourth forward speed ratio is established with the engagement of the torque-transmitting mechanisms 50, 52, and 54. During the fourth forward speed ratio, the planetary gearsets 20, 30, and 40 are rotated in unison with the input shaft 17, and the output shaft 19 rotates in unison with the planetary gearset 20. Therefore, the numerical value of the fourth forward speed ratio is unity.

The fifth forward speed ratio is established with the engagement of the torque-transmitting mechanisms 50, 52, and 58. During the fifth forward speed ratio, the planet carrier assembly member 46 and ring gear member 24 are driven at the speed of the input shaft 17. The sun gear member 42 and sun gear member 22 are driven at a speed determined by the speed of the planet carrier assembly member 46 and the ring gear/sun gear tooth ratio of the planetary gearset 40. The planet carrier assembly member 26 and therefore output shaft 19 are driven at a speed determined by the speed of the ring gear member 24, the speed of the sun gear member 22, and the ring gear/sun gear tooth ratio of the planetary gearset 20. The numerical value of the fifth forward speed ratio is determined by the ring gear/sun gear tooth ratios of the planetary gearsets 20 and 40.

The sixth forward speed ratio is established with the engagement of the torque-transmitting mechanisms 52, 54, and 58. During the sixth forward speed ratio, the sun gear members 22 and 42 are driven at a speed determined by the speed of the planet carrier assembly member 46 and the ring gear/sun gear tooth ratio of the planetary gearset 40. The ring gear members 34 and 24 are driven at a speed determined by the speed of the planet carrier assembly member 36 and the ring gear/sun gear tooth ratio of the planetary gearset 30. The planet carrier assembly member 26 and therefore output shaft 19 is driven at a speed determined by the speed of the sun gear member 22, the speed of the ring gear member 24, and the ring gear/sun gear tooth ratio of the planetary gearset 20. The numerical value of the sixth forward speed ratio is determined by the ring gear/sun gear tooth ratios of all three planetary gearsets 20, 30, and 40.

The truth table of FIG. 2 provides an example of numerical values that can be utilized with the planetary gear arrangement 18 in the forward and reverse speed ratios. These numerical values have been determined utilizing the ring gear/sun gear tooth ratios of the planetary gearsets 20, 30, and 40 that are represented by the ratios R1/S1, R2/S2, and R3/S3, respectively. The chart in FIG. 2 provides a numerical value for these ratios steps between adjacent forward speed ratios and between the reverse and first forward speed ratio.

As noted in the truth table, these single step forward ratio interchanges, as well as the double step forward interchanges, are of the single transition variety. It should also be noted that the reverse-to-first interchange is accomplished simply by swapping the torque-transmitting mechanisms 58 and 54. This simplifies the forward/reverse shifting.

Figures 3, 4:
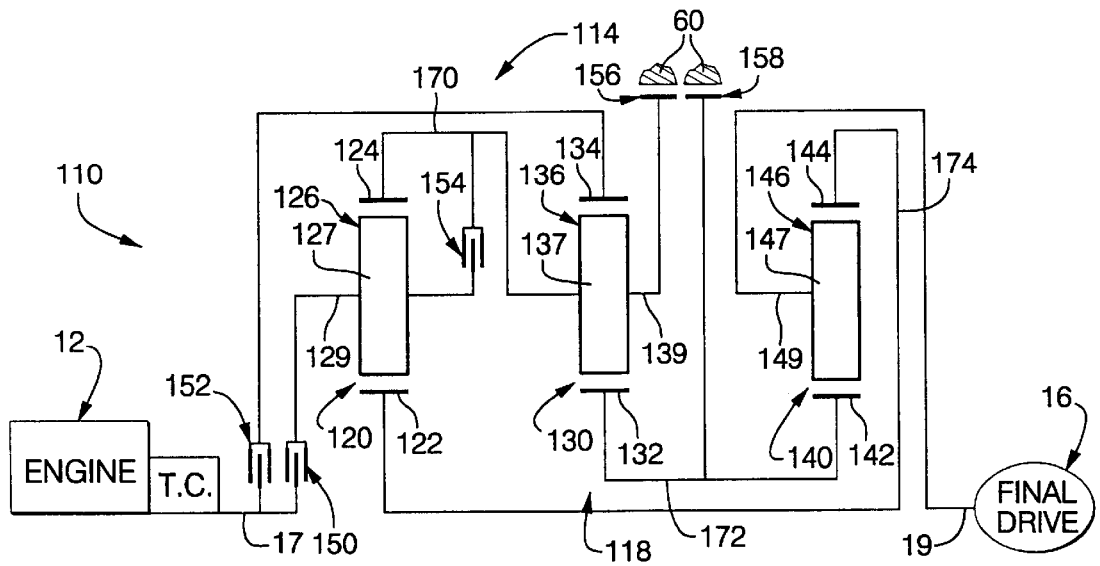
FIG. 3 is a schematic representation of a powertrain having another of the family members incorporating another embodiment of the present invention.
FIG. 4 is a truth table and chart depicting some of the operating characteristics of the planetary arrangement shown in FIG. 3.

A powertrain 110, shown in FIG. 3, includes the engine and torque converter 12, a planetary transmission 114, and the final drive mechanism 16. The planetary transmission 114 includes the input shaft 17, a planetary gear arrangement 118, and the output shaft 19. The planetary gear arrangement 118 includes three simple planetary gearsets 120, 130, and 140, and five torque-transmitting mechanisms 150, 152, 154, 156, and 158. The torque-transmitting mechanisms 150, 152, and 154 are rotating type torque-transmitting mechanisms, and the torque-transmitting mechanisms 156 and 158 are stationary type torque-transmitting mechanisms.

The planetary gearset 120 includes a sun gear member 122, a ring gear member 124, and a planet carrier assembly member 126. The planet carrier assembly member 126 includes a plurality of pinion gears 127 that are rotatably mounted on a planet carrier 129 and disposed in meshing relationship with the sun gear member 122 and the ring gear member 124.

The planetary gearset 130 includes a sun gear member 132, a ring gear member 134, and a planet carrier assembly member 136. The planet carrier assembly member 136 includes a plurality of pinion gears 137 that are rotatably mounted on a planet carrier 139 and disposed in meshing relationship with the sun gear member 132 and the ring gear member 134.

The planetary gearset 140 includes a sun gear member 142, a ring gear member 144, and a planet carrier assembly member 146. The planet carrier assembly member 146 includes a plurality of pinion gears 147 that are rotatably mounted on a planet carrier 149 and disposed in meshing relationship with the sun gear member 142 and the ring gear member 144.

The ring gear member 124 is continuously connected with the planet carrier assembly member 136 by an interconnecting member 170 and selectively connectible with the transmission housing 60 through the torque-transmitting mechanism 156. The sun gear member 132 and the sun gear member 142 are continuously interconnected by an interconnecting member 172 which is selectively connectible with the transmission housing 60 through the torque-transmitting mechanism 158. The sun gear member 122 and ring gear member 144 are continuously interconnected by an interconnecting member 174. The planet carrier assembly member 146 is continuously connected with the output shaft 19. The input shaft 17 is selectively connectible with the ring gear member 134 through the torque-transmitting mechanism 152, and with the planet carrier assembly member 126 through the torque-transmitting mechanism 150. The planet carrier assembly member 126 is selectively connectible with the interconnecting member 170 through the torque-transmitting mechanism 154.

The truth table shown in FIG. 4 sets forth the engagement sequence and combination of engagements for the torque-transmitting mechanisms 150, 152, 154, 156, and 158. These torque-transmitting mechanisms are engaged in combinations of three, as seen in the truth table, to provide a reverse speed ratio and six forward speed ratios.

The reverse speed ratio is established with the engagement of the torque-transmitting mechanisms 152, 154, and 156. During the reverse speed ratio, the sun gear member 132 and sun gear member 142 are driven at a speed determined by the speed of the ring gear member 134 and the ring gear/sun gear tooth ratio of the planetary gearset 130. The planet carrier assembly member 146 and therefore output shaft 19 are driven at a speed determined by the speed of the sun gear member 142 and the ring gear/sun gear tooth ratio of the planetary gearset 140. The numerical value of the reverse speed ratio is determined by the ring gear/sun gear tooth ratios of the planetary gearsets 130 and 140.

The first forward speed ratio is established with the engagement of the torque-transmitting mechanisms 152, 154, and 158. During the first forward speed ratio, the planet carrier assembly member 136, the planetary gearset 120, and the ring gear member 144 are driven at a speed determined by the speed of the ring gear member 134 and the ring gear/sun gear tooth ratio of the planetary gearset 130. The planet carrier assembly member 146 and therefore output shaft 19 are driven at a speed determined by the speed of the ring gear member 144 and the ring gear/sun gear tooth ratio of the planetary gearset 140. The numerical value of the first forward speed ratio is determined by ring gear/sun gear tooth ratios of the planetary gearsets 130 and 140.

The second forward speed ratio is established with the engagement of the torque-transmitting mechanisms 150, 154, and 158. With this combination of engagements, the planetary gearset 120 and the ring gear member 144 are driven at the speed of the input shaft 17, the sun gear members 132 and 142 are held stationary. The planet carrier assembly member 146 and therefore output shaft 19 are driven at a speed determined by the speed of the ring gear member 144 and the ring gear/sun gear tooth ratio of the planetary gearset 140. The numerical value of the second forward speed ratio is determined by the ring gear/sun gear tooth ratio of the planetary gearset 140.

The third forward speed ratio is established with the engagement of the torque-transmitting mechanisms 150, 152, and 154. This combination of engagements causes all three planetary gearsets to rotate as a single unit, such that the input shaft 17, the planetary gear arrangement 118, and the output shaft 19 all rotate as a single unit. Therefore the numerical value of the third forward speed ratio is unity.

The fourth forward speed ratio is established with the engagement of the torque-transmitting mechanisms 150, 152, and 158. During the fourth forward speed ratio, the planet carrier assembly member 136 and ring gear member 124 are driven at a speed determined by the speed of the ring gear member 134 and the ring gear/sun gear tooth ratio of the planetary gearset 130. The sun gear member 122 and ring gear member 144 are driven at a speed determined by the speed of the ring gear member 124, the speed of the planet carrier assembly member 126, and the ring gear/sun gear tooth ratio of the planetary gearset 120. The planet carrier assembly member 146 and therefore output shaft 19 are driven at a speed determined by the speed of the ring gear member 144 and the ring gear/sun gear tooth ratio of the planetary gearset 140. The numerical value of the fourth forward speed ratio is determined by the ring gear/sun gear tooth ratios of all three planetary gearsets 120, 130, and 140.

The fifth forward speed ratio is established with the engagement of the torque-transmitting mechanisms 150, 152, and 156. During the fifth forward speed ratio, the sun gear member 122 is driven at a speed determined by the speed of the planet carrier assembly member 126 and the ring gear/sun gear tooth ratio of the planetary gearset 120. The sun gear members 132 and 142 are driven at a speed determined by the speed of the ring gear member 134 and the ring gear/sun gear tooth ratio of the planetary gearset 130. The planet carrier assembly member 146 and therefore output shaft 19 are driven at a speed determined by the speed of the ring gear member 144, the speed of the sun gear member 142, and the ring gear/sun gear tooth ratio of the planetary gearset 140. The numerical value of the fifth forward speed ratio is determined by the ring gear/sun gear tooth ratios of all three planetary gearsets 120, 130, and 140.

The sixth forward speed ratio is established with the engagement of the torque-transmitting mechanisms 150, 156, and 158. During the sixth forward speed ratio, the sun gear member 122 and ring gear member 144 are driven at a speed determined by the speed of the planet carrier assembly member 126 and the ring gear/sun gear tooth ratio of the planetary gearset 120. The planet carrier assembly member 146 and therefore output shaft 19 are driven at a speed determined by the speed of the ring gear member 144 and the ring gear/sun gear tooth ratio of the planetary gearset 140. The numerical value of the sixth forward speed ratio is determined by the ring gear/sun gear tooth ratios of the planetary gearsets 120 and 140.

The truth table and chart shown in FIG. 4 depicts an example of the numerical values for the reverse speed ratio and the six forward speed ratios. These numerical values are determined utilizing the ring gear/sun gear tooth ratios of the planetary gearsets 120, 130, and 140 as given by way of example as R1/S1, R2/S2, and R3/S3, respectively. FIG. 4 depicts an example of the ratio steps which are present between adjacent forward speeds when these gear ratios are utilized and the overall ratio spread of the forward drives is also given in this chart.

Figures 5, 6:
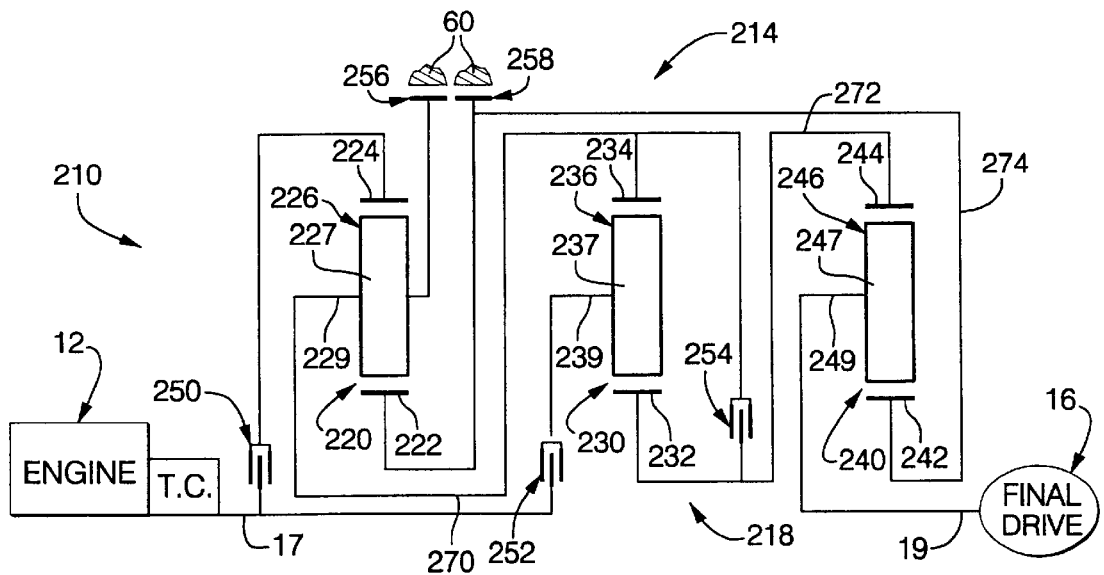
FIG. 5 is a schematic representation of a powertrain having another of the family members incorporating another embodiment of the present invention.
FIG. 6 is a truth table and chart depicting some of the operating characteristics of the planetary arrangement shown in FIG. 6.

A powertrain 210, shown in FIG. 5, includes the engine and torque converter 12, a planetary transmission 214, and the final drive mechanism 16. The planetary transmission 214 includes the input shaft 17, a planetary gear arrangement 218, and the output shaft 19. The planetary gear arrangement 218 includes three simple planetary gearsets 220, 230, and 240, and five torque-transmitting mechanisms 250, 252, 254, 256, and 258. The torque-transmitting mechanisms 250, 252, and 254 are rotating type torque-transmitting mechanisms and the two torque-transmitting mechanisms 256 and 258 are stationary type torque-transmitting mechanisms.

The planetary gearset 220 includes a sun gear member 222, a ring gear member 224, and a planet carrier assembly member 226. The planet carrier assembly member 226 includes a plurality of pinion gears 227 that are rotatably mounted on a planet carrier 229 and disposed in meshing relationship with the sun gear member 222 and the ring gear member 224.

The planetary gearset 230 includes a sun gear member 232, a ring gear member 234, and a planet carrier assembly member 236. The planet carrier assembly member 236 includes a plurality of pinion gears 237 that are rotatably mounted on a planet carrier 239 and disposed in meshing relationship with the sun gear member 232 and the ring gear member 234.

The planetary gearset 240 includes a sun gear member 242, a ring gear member 244, and a planet carrier assembly member 246. The planet carrier assembly member 246 includes a plurality of pinion gears 247 that are rotatably mounted on a planet carrier 249 and disposed in meshing relationship with the sun gear member 242 and the ring gear member 244.

The planet carrier assembly member 226 and ring gear member 234 are continuously interconnected by an interconnecting member 270. The sun gear member 232 and ring gear member 244 are continuously interconnected by an interconnecting member 272, which is selectively connectible with the interconnecting member 270 through the torque-transmitting mechanism 254. The sun gear member 222 and the sun gear member 242 are continuously interconnected by an interconnecting member 274 which is also selectively connectible with the transmission housing 60 through the torque-transmitting mechanism 258. The output shaft 19 is continuously connected with the planet carrier assembly member 246. The input shaft 17 is selectively connectible with the ring gear member 224 through the torque-transmitting mechanism 250, and selectively connectible with the planet carrier assembly member 236 through the torque-transmitting mechanism 252. The interconnecting member 270 is selectively connectible with the transmission housing 60 through the torque-transmitting mechanism 256. The ring gear member 224 and planet carrier assembly member 236 are noncontinuously connected members of their respective planetary gearsets 220 and 230.

The truth table in FIG. 6 describes the engagement sequence and combinations of engagement for the torque-transmitting mechanisms in order to establish six forward speed ratios and one reverse speed ratio in the planetary gear arrangement 218 between the input shaft 17 and the output shaft 19. As can be seen in the table, the torque-transmitting mechanisms are engaged in combinations of three.

The reverse speed ratio is established with the engagement of the torque-transmitting mechanisms 250, 254, and 256. During the reverse speed ratio, the sun gear members 222 and 242 are driven at a speed determined by the speed of the ring gear member 224 and the ring gear/sun gear tooth ratio of the planetary gearset 220. The planet carrier assembly member 246 and therefore output shaft 19 are driven at a speed determined by the speed of the sun gear member 242 and the ring gear/sun gear tooth ratio of the planetary gearset 240. The numerical value of the reverse speed ratio is determined by the ring gear/sun gear tooth ratios of the planetary gearsets 220 and 240.

The first forward speed ratio is established with the engagement of the torque-transmitting mechanisms 250, 254, and 258. During the first forward speed ratio, the planet carrier assembly member 226 and ring gear member 234 are driven at a speed determined by the speed of the ring gear member 224 and the ring gear/sun gear tooth ratio of the planetary gearset 220. The planet carrier assembly member 246 and therefore output shaft 19 are driven at a speed determined by the speed of the ring gear member 244 and the ring gear/sun gear tooth ratio of the planetary gearset 240. The numerical value of the first forward speed ratio is determined by the ring gear/sun gear tooth ratios of the planetary gearsets 220 and 240. It should be noted that planetary gearset 230 rotates as a unit along with the planet carrier assembly member 226 and ring gear member 244 during the first forward speed ratio.

The second forward speed ratio is established with the engagement of the torque-transmitting mechanisms 252, 254, and 258. During the second forward speed ratio, the planetary gearset 230 and ring gear member 244 are driven in unison with the input shaft 17. The output shaft 19 and planet carrier assembly member 246 are driven at a speed determined by the speed of the ring gear member 244 and the ring gear/sun gear tooth ratio of the planetary gearset 240. The numerical value of the second forward speed ratio is determined by the ring gear/sun gear tooth ratio of the planetary gearset 240.

The third forward speed ratio is established with the engagement of the torque-transmitting mechanisms 250, 252, and 254. This combination of engagement of the torque-transmitting mechanisms causes all three planetary gearsets to rotate in unison with the input shaft 17. Therefore the output shaft 19 also rotates in unison with the input shaft 17. The numerical value of the third forward speed ratio is one.

The fourth forward speed ratio is established with the engagement of the torque-transmitting mechanisms 250, 252, and 258. During the fourth forward speed ratio, the planet carrier assembly member 226 and ring gear member 234 are driven at a speed determined by the speed of the ring gear member 224 and the ring gear/sun gear tooth ratio of the planetary gearset 220. The sun gear member 232 and ring gear member 244 are driven at a speed determined by the speed of the ring gear member 234, the speed of the planet carrier assembly member 236, and the ring gear/sun gear tooth ratio of the planetary gearset 230. The planet carrier assembly member 246 and therefore output shaft 19 are driven at a speed determined by the speed of the ring gear member 244 and the ring gear/sun gear tooth ratio of the planetary gearset 240. The numerical value of the fourth forward speed ratio is determined by the ring gear/sun gear tooth ratios of all three planetary gearsets 220, 230, and 240.

The fifth forward speed ratio is established with the engagement of the torque-transmitting mechanisms 250, 252, and 256. During the fifth forward speed ratio, the sun gear members 222 and 242 are driven at a speed determined by the speed of the ring gear member 224 and the ring gear/sun gear tooth ratio of the planetary gearset 220. The sun gear member 232 and ring gear member 244 are driven at a speed determined by the speed of the planet carrier assembly member 236 and the ring gear/sun gear tooth ratio of the planetary gearset 230. The planet carrier assembly member 246 and therefore output shaft 19 are driven at a speed determined by the speed of the ring gear member 244, the speed of the sun gear member 242, and the ring gear/sun gear tooth ratio of the planetary gearset 240. The numerical value of the fifth forward speed ratio is determined by the ring gear/sun gear tooth ratios of all three planetary gearsets 220, 230, and 240.

The sixth forward speed ratio is established with the engagement of the torque-transmitting mechanisms 252, 256, and 258. During the sixth forward speed ratio, the sun gear member 232 and ring gear member 244 are driven at a speed determined by the speed of the planet carrier assembly member 236 and the ring gear/sun gear tooth ratio of the planetary gearset 230. The planet carrier assembly member 246 and therefore output shaft 19 are driven at a speed determined by the speed of the ring gear member 244 and the ring gear/sun gear tooth ratio of the planetary gearset 240. The numerical value of the sixth forward speed ratio is determined by the ring gear/sun gear tooth ratios of planetary gearsets 230 and 240.

The truth table of FIG. 6 provides a numerical example of the speed ratios that are available in the planetary gear arrangement 218 when the ring gear/sun gear tooth ratios of the planetary gearsets 220, 230, and 240 are equal to the ratios R1/S1, R2/S2, and R3/S3, respectively. Also shown in FIG. 6 is a chart depicting the values for the ratio steps when the numerical speed ratios are utilized. The truth table shows that the single step and double step forward interchanges are of the single transition variety.

Figures 7, 8:
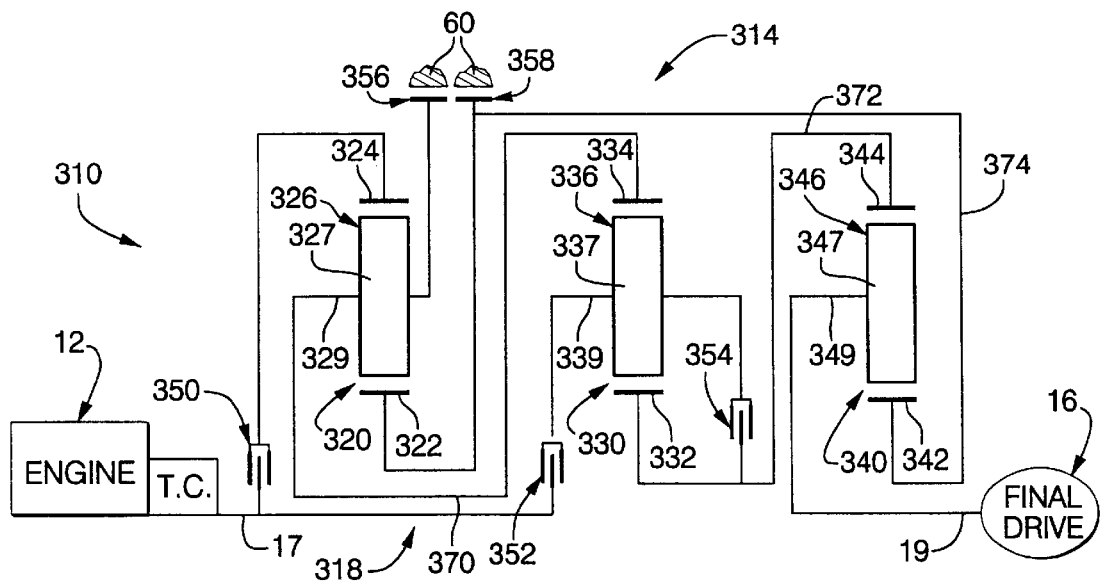
FIG. 7 is a schematic representation of a powertrain having another of the family members incorporating another embodiment of the present invention.
FIG. 8 is a truth table and chart depicting some of the operating characteristics of the planetary arrangement shown in FIG. 7.

A powertrain 310, shown in FIG. 7, includes the engine and torque converter 12, a planetary transmission 314, and the final drive mechanism 16. The planetary transmission 314 includes the input shaft 17, a planetary gear arrangement 318, and the output shaft 19. The planetary gear arrangement 318 includes three simple planetary gearsets 320, 330, and 340, and five torque-transmitting mechanisms 350, 352, 354, 356, and 358. The torque-transmitting mechanisms 350, 352, and 354 are of the rotating type torque-transmitting mechanisms, and the torque-transmitting mechanisms 356 and 358 are of the stationary type torque-transmitting mechanisms.

The planetary gearset 320 includes a sun gear member 322, a ring gear member 324, and a planet carrier assembly member 326. The planet carrier assembly member 326 includes a plurality of pinion gears 327 that are rotatably mounted on a planet carrier 329 and disposed in meshing relationship with the sun gear member 322 and the ring gear member 324.

The planetary gearset 330 includes a sun gear member 332, a ring gear member 334, and a planet carrier assembly member 336. The planet carrier assembly member 336 includes a plurality of pinion gears 337 that are rotatably mounted on a planet carrier 339 and disposed in meshing relationship with the sun gear member 332 and the ring gear member 334.

The planetary gearset 340 includes a sun gear member 342, a ring gear member 344, and a planet carrier assembly member 346. The planet carrier assembly member 346 includes a plurality of pinion gears 347 that are rotatable mounted on a planet carrier 349 and disposed in meshing relationship with the sun gear member 342 and the ring gear member 344.

Planet carrier assembly member 326 and ring gear member 334 are continuously interconnected by an interconnecting member 370 which is selectively connectible with the transmission housing 60 through the torque-transmitting mechanism 356. The sun gear member 332 and ring gear member 344 are continuously interconnected by an interconnecting member 372, which is selectively connectible with the planet carrier assembly member 336. The sun gear member 322 and sun gear member 342 are continuously interconnected by an interconnecting member 374, which is selectively connectible with the transmission housing 60 through the torque-transmitting mechanism 358. The output shaft 19 is continuously connected with the planet carrier assembly member 346. The input shaft 17 is selectively connectible with the ring gear member 324 through the torque-transmitting mechanism 350, and selectively connectible with the planet carrier assembly member 336 through the torque-transmitting mechanism 352.

As shown in the truth table of FIG. 8, the torque-transmitting mechanisms are selectively engaged in combinations of three to establish six forward speed ratios and one reverse speed ratio in the planetary gear arrangement 318 between the input shaft 17 and the output shaft 19.

The reverse speed ratio is established with the engagement of the torque-transmitting mechanisms 350, 354, and 356. During the reverse speed ratio, the sun gear members 322 and 342 are driven at a speed determined by the speed of the ring gear member 324 and the ring gear/sun gear tooth ratio of the planetary gearset 320. The planet carrier assembly member 346 and therefore output shaft 19 are driven at a speed determined by the speed of the sun gear member 342 and the ring gear/sun gear tooth ratio of the planetary gearset 340. The numerical value of the reverse speed ratio is determined by the ring gear/sun gear tooth ratios of the planetary gearsets 320 and 340.

The first forward speed ratio is established with the engagement of the torque-transmitting mechanisms 350, 354, and 358. During the first forward speed ratio, the planet carrier assembly member 326 and the ring gear member 344 are driven at a speed determined by the speed of the ring gear member 324 and the ring gear/sun gear tooth ratio of the planetary gearset 320. The planet carrier assembly member 346 and therefore output shaft 19 are driven at a speed determined by the speed of the ring gear member 344 and the ring gear/sun gear tooth ratio of the planetary gearset 340. The numerical value of the first forward speed ratio is determined by the ring gear/sun gear tooth ratios of the planetary gearset 320 and 340.

The second forward speed ratio is established with the engagement of the torque-transmitting mechanisms 352, 354, and 358. During the second forward speed ratio, the planetary gearset 330 and the ring gear member 344 are driven at the speed of the input shaft 17. The planet carrier assembly member 346 and therefore output shaft 19 are driven at a speed determined by the speed of the ring gear member 344 and the ring gear/sun gear tooth ratio of the planetary gearset 340. The numerical value of the second forward speed ratio is determined by the ring gear/sun gear tooth ratio of the planetary gearset 340.

The third forward speed ratio is established with the engagement of the torque-transmitting mechanisms 350, 352, and 354. This combination of engagements causes the three planetary gearsets 320, 330, and 340 to rotate in unison with the input shaft 17, and therefore the output shaft 19 also rotates in unison. The numerical value of the third forward speed ratio is one.

The fourth forward speed ratio is established with the engagement of the torque-transmitting mechanisms 350, 352, and 358. During the fourth forward speed ratio, the planet carrier assembly member 326 and ring gear member 334 are driven at a speed determined by the speed of the ring gear member 324 and the ring gear/sun gear tooth ratio of the planetary gearset 320. The sun gear member 332 and ring gear member 344 are driven at a speed determined by the speed of the ring gear member 334, the speed of the planet carrier assembly member 336, and the ring gear/sun gear tooth ratio of the planetary gearset 330. The planet carrier assembly member 346 and therefore output shaft 19 are driven at a speed determined by the speed of the ring gear member 344 and the ring gear/sun gear tooth ratio of the planetary gearset 340. The numerical value of the fourth forward speed ratio is determined by the ring gear/sun gear tooth ratios of all three planetary gearsets 320, 330, and 340.

The fifth forward speed ratio is established with the engagement of the torque-transmitting mechanisms 350, 352, and 356. During the fifth forward speed ratio, the sun gear members 322 and 342 are driven at a speed determined by the speed of the ring gear member 324 and the ring gear/sun gear tooth ratio of the planetary gearset 320. The sun gear member 332 and ring gear member 344 are driven at a speed determined by the speed of the planet carrier assembly member 346 and the ring gear/sun gear tooth ratio of the planetary gearset 330. The planet carrier assembly member 346 and therefore output shaft 19 are driven at a speed determined by the speed of the ring gear member 344, the speed of the sun gear member 342, and the ring gear/sun gear tooth ratio of the planetary gearset 340. The numerical value of the fifth forward speed ratio is determined by the ring gear/sun gear tooth ratios of the planetary gearsets 320, 330, and 340.

The sixth forward speed ratio is established with the engagement of the torque-transmitting mechanisms 352, 356, and 358. During the sixth forward speed ratio, the sun gear member 332 and ring gear member 344 are driven at a speed determined by the speed of the planet carrier assembly member 336 and the ring gear/sun gear tooth ratio of the planetary gearset 330. The planet carrier assembly member 346 and output shaft 19 are driven at a speed determined by the speed of the ring gear member 344 and the ring gear/sun gear tooth ratio of the planetary gearset 340. The numerical value of the sixth forward speed ratio is determined by the ring gear/sun gear tooth ratios of the planetary gearsets 330 and 340.

The truth table of FIG. 8 provides numerical examples of the reverse speed ratio and the six forward speed ratios. These numerical examples are determined utilizing the ring gear/sun gear tooth ratios of the planetary gearsets 320, 330, and 340 as given in FIG. 8 as R1/S1, R2/S2, and R3/S3, respectively. The truth table also shows that the single step and double step forward ratio interchanges are of the single transition variety. Also depicted in FIG. 8 is a chart which illustrates the ratio steps between adjacent forward speed ratios as well as between the reverse and the first forward speed ratio that are available when the given speed ratio values are employed.

Figures 9, 10:
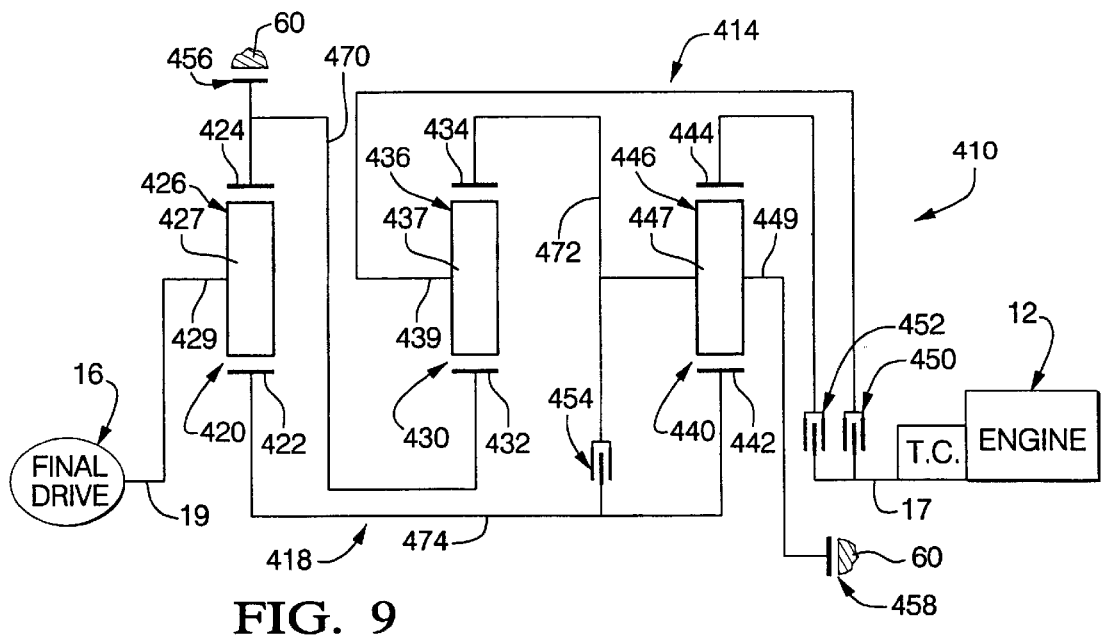
FIG. 9 is a schematic representation of a powertrain having another of the family members incorporating another embodiment of the present invention.
FIG. 10 is a truth table and chart depicting some of the operating characteristics of the planetary arrangement shown in FIG. 9.

A powertrain 410, shown in FIG. 9, includes the engine and torque converter 12, a planetary transmission 414, and the final drive mechanism 16. The planetary transmission 414 includes the input shaft 17, a planetary gear arrangement 418, and the output shaft 19. The planetary gear arrangement 418 includes three simple planetary gearsets 420, 430, and 440, and five torque-transmitting mechanisms 450, 452, 454, 456, and 458. The torque-transmitting mechanisms 450, 452, and 454 are rotating type torque-transmitting mechanisms, and the torque-transmitting mechanisms 456 and 458 are stationary type torque-transmitting mechanisms.

The planetary gearset 420 includes a sun gear member 422, a ring gear member 424, and a planet carrier assembly member 426. The planet carrier assembly member 426 includes a plurality of pinion gears 427 that are rotatably mounted on a planet carrier 429 and disposed in meshing relationship with the sun gear member 422 and the ring gear member 424.

The planetary gearset 430 includes a sun gear member 432, a ring gear member 434, and a planet carrier assembly member 436. The planet carrier assembly member 436 includes a plurality of pinion gears 437 that are rotatably mounted on a planet carrier 439 and disposed in meshing relationship with the sun gear member 432 and the ring gear member 434.

The planetary gearset 440 includes a sun gear member 442, a ring gear member 444, and a planet carrier assembly member 446. The planet carrier assembly member 446 includes a plurality of pinion gears 447 that are rotatable mounted on a planet carrier 449 and disposed in meshing relationship with the sun gear member 442 and the ring gear member 444.

The ring gear member 424 and sun gear member 432 are continuously interconnected by an interconnecting member 470, which is selectively connectible with the transmission housing 60 through the torque-transmitting mechanism 456. The ring gear member 434 and planet carrier assembly member 446 are continuously interconnected by an interconnecting member 472 which is selectively connectible with the transmission housing 60 through the torque-transmitting mechanism 458. The sun gear members 422 and 442 are continuously interconnected by an interconnecting member 474, which is selectively connectible with the interconnecting member 472 through the torque-transmitting mechanism 454. The output shaft 19 is continuously connected with the planet carrier assembly member 426. The input shaft 17 is selectively connectible with the planet carrier assembly member 436 through the torque-transmitting mechanism 450, and selectively connectible with the ring gear member 444 through the torque-transmitting mechanism 452. The planet carrier assembly member 436 and ring gear member 444 are noncontinuously connected members of their respective planetary gearsets 430 and 440.

The torque-transmitting mechanisms are engaged in combinations of three, as shown in the truth table of FIG. 10, to establish six forward speed ratios and one reverse speed ratio between the input shaft 17 and the output shaft 19 through the planetary gear arrangement 418.

The reverse speed ratio is established with the engagement of the torque-transmitting mechanisms 452, 456, and 458. During the reverse speed ratio, the sun gear members 442 and 422 are driven at a speed determined by the speed of the ring gear member 444 and the ring gear/sun gear tooth ratio of the planetary gearset 440. The planet carrier assembly member 426 and therefore output shaft 19 are driven at a speed determined by the speed of the sun gear member 422 and the ring gear/sun gear tooth ratio of the planetary gearset 420. The numerical value of the reverse speed ratios is determined by the ring gear/sun gear tooth ratio of the planetary gearsets 440 and 420.

The first forward speed ratio is established with the engagement of the torque-transmitting mechanisms 452, 454, and 456. During the first forward speed ratio, the planetary gearset 440 and sun gear member 422 are driven as a single unit. The planet carrier assembly member 426 and therefore output shaft 19 are driven at a speed determined by the speed of the sun gear member 422 and the ring gear/sun gear tooth ratio of the planetary gearset 420. The numerical value of the first forward speed ratio is determined by the ring gear/sun gear tooth ratio of the planetary gearsets 420.

The second forward speed ratio is established with engagement of the torque-transmitting mechanisms 450, 454, and 456. During the second forward speed ratio, the ring gear member 434, planetary gearset 440, and sun gear member 422 are driven at a speed determined by the speed of the planet carrier assembly member 436 and the ring gear/sun gear tooth ratio of the planetary gearset 430. The planet carrier assembly member 426 and therefore output shaft 19 are driven at a speed determined by the speed of the sun gear member 422 and the ring gear/sun gear tooth ratio of the planetary gearset 420. The numerical value of the second forward speed ratio is determined by the ring gear/sun gear tooth ratios of the planetary gearsets 430 and 420.

The third forward speed ratio is established with the engagement of the torque-transmitting mechanisms 450, 452, and 456. During the third forward speed ratio, the ring gear member 434 and planet carrier assembly member 446 are driven at a speed determined by the speed of the planet carrier assembly member 436 and the ring gear/sun gear tooth ratio of the planetary gearset 430. The sun gear members 442 and 422 are driven at a speed determined by the speed of the ring gear member 444, the speed of the planet carrier assembly member 446, and the ring gear/sun gear tooth ratio of the planetary gearset 440. The planet carrier assembly member 426 and therefore output shaft 19 are driven at a speed determined by the speed of the sun gear member 422 and the ring gear/sun gear tooth ratio of the planetary gearset 420. The numerical value of the third forward speed ratio is determined by the ring gear/sun gear tooth ratios of all three planetary gearsets 420, 430, and 440.

The fourth forward speed ratio is established with the engagement of the torque-transmitting mechanisms 450, 452, and 454. This combination of engagements causes the input shaft 17, the planetary gear arrangement 418, and the output shaft 19 to rotate as a single unit. Therefore the numerical value of the fourth forward speed ratio is unity.

The fifth forward speed ratio is established with the engagement of the torque-transmitting mechanisms 450, 452, and 458. During the fifth forward speed ratio, the sun gear member 432 and ring gear member 424 are driven at a speed determined by the speed of the planet carrier assembly member 436 and the ring gear/sun gear tooth ratio of the planetary gearset 430. The sun gear members 442 and 422 are driven at a speed determined by the speed of the ring gear member 444 and the ring gear/sun gear tooth ratio of the planetary gearset 440. The planet carrier assembly member 426 and therefore output shaft 19 are driven at a speed determined by the speed of the ring gear member 424, the speed of the sun gear member 422, and the ring gear/sun gear tooth ratio of the planetary gearset 420. The numerical value of the fifth forward speed ratio is determined by the ring gear/sun gear tooth ratios of all three planetary gearsets 420, 430, and 440.

The sixth forward speed ratio is established with the engagement of the torque-transmitting mechanisms 450, 454, and 458. During the sixth forward speed ratio, the sun gear member 432 and ring gear member 424 are driven at a speed determined by the speed of the planet carrier assembly member 436 and the ring gear/sun gear tooth ratio of the planetary gearset 430. The planet carrier assembly member 426 and therefore output shaft 19 are driven at a speed determined by the speed of the ring gear member 424 and the ring gear/sun gear tooth ratio of the planetary gearset 420. The numerical value of the sixth forward speed ratio is determined by the ring gear/sun gear tooth ratios of the planetary gearsets 430 and 420. The combination of the torque-transmitting mechanism 458 and torque-transmitting mechanism 454 results in the planetary gearset 440, the ring gear member 434, and the sun gear member 422 being held stationary as reaction members within the planetary gear arrangement 418.

The truth table in FIG. 10 depicts an example of the numerical ratios that are available in the planetary gear arrangement 418. These numerical values have been determined utilizing the ring gear/sun gear tooth ratios of the planetary gearsets 420, 430, and 440 as set forth in FIG. 10 as R1/S1, R2/S2, and R3/S3, respectively. As can be seen from the truth table, all of the single step and double step forward ratio interchanges are of the single transition variety. Also, the forward/reverse interchange is accompanied with the interchange of a single friction device.

The chart in FIG. 10 provides an example of the ratio steps between adjacent forward speed ratios, as well as between the reverse and first forward speed ratio, that are available with the given numerical values for the speed ratios.

Figures 11, 12:
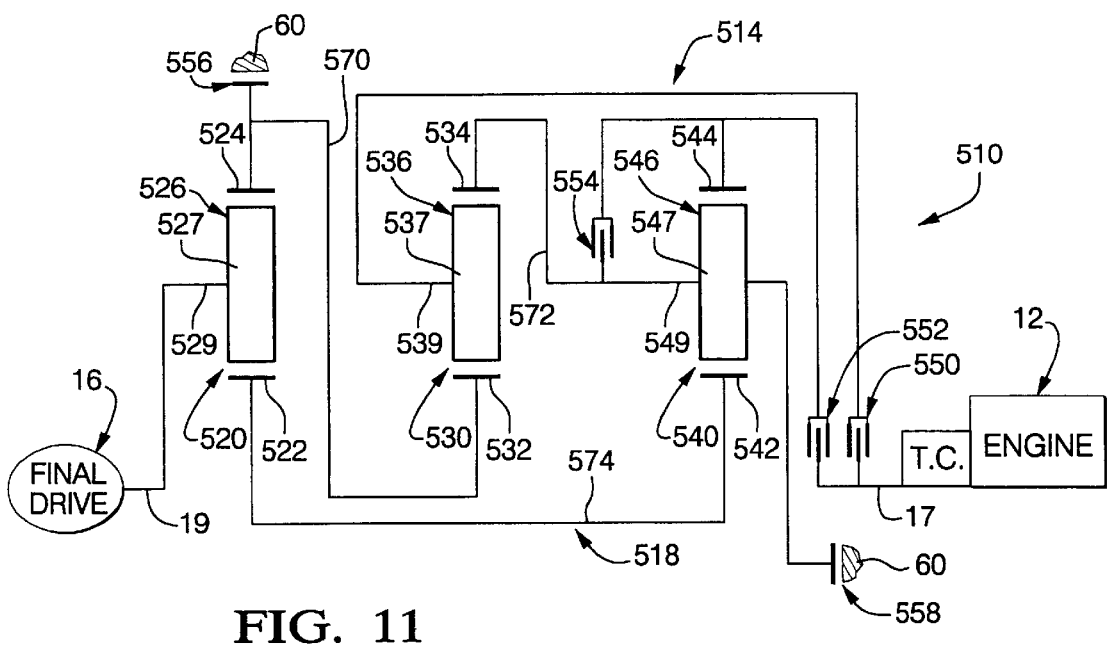
FIG. 11 is a schematic representation of a powertrain having another of the family members incorporating another embodiment of the present invention.
FIG. 12 is a truth table and chart depicting some of the operating characteristics of the planetary arrangement shown in FIG. 11.

A powertrain 510, shown in FIG. 11, includes the engine and torque converter 12, a planetary transmission 514, and the final drive mechanism 16. The planetary transmission 514 includes the input shaft 17, a planetary gear arrangement 518, and the output shaft 19. The planetary gear arrangement 518 includes three simple planetary gearsets 520, 530, and 540, and five torque-transmitting mechanisms 550, 552, 554, 556, and 558. The torque-transmitting mechanisms 550, 552, and 554 are rotating type torque-transmitting mechanisms, and the torque-transmitting mechanisms 556 and 558 are stationary type torque-transmitting mechanisms.

The planetary gearset 520 includes a sun gear member 522, a ring gear member 524, and a planet carrier assembly member 526. The planet carrier assembly member 526 includes a plurality of pinion gears 527 that are rotatably mounted on a planet carrier 529 and disposed in meshing relationship with the sun gear member 522 and the ring gear member 524.

The planetary gearset 530 includes a sun gear member 532, a ring gear member 534, and a planet carrier assembly member 536. The planet carrier assembly member 536 includes a plurality of pinion gears 537 that are rotatably mounted on a planet carrier 539 and disposed in meshing relationship with the sun gear member 532 and the ring gear member 534.

The planetary gearset 540 includes a sun gear member 542, a ring gear member 544, and a planet carrier assembly member 546. The planet carrier assembly member 546 includes a plurality of pinion gears 547 that are rotatable mounted on a planet carrier 549 and disposed in meshing relationship with the sun gear member 542 and the ring gear member 544.

The ring gear member 524 and sun gear member 532 are continuously interconnected by an interconnecting member 570, which is selectively connectible with the transmission housing 60 through the torque-transmitting mechanism 556. The ring gear member 534 and planet carrier assembly member 546 are continuously interconnected with an interconnecting member 572, which is selectively connectible with the ring gear member 544 through the torque-transmitting mechanism 554, and selectively connectible with the transmission housing 60 through the torque-transmitting mechanism 558. The sun gear members 522 and 542 are continuously interconnected with an interconnecting member 574. The output shaft 19 is continuously connected with the planet carrier assembly member 526. The input shaft 17 is selectively connectible with the planet carrier assembly member 536 through the torque-transmitting mechanism 550, and selectively connectible with the ring gear member 544 through the torque-transmitting mechanism 552. It should be noted that the planet carrier assembly member 536 and ring gear member 544 are noncontinuously interconnected members of their respective planetary gearsets 530 and 540.

The torque-transmitting mechanisms are engaged in combinations of three to provide six forward speed ratios and one reverse speed ratio as shown in the truth table of FIG. 12. FIG. 12 also provides an example of numerical values for these speed ratios. These numerical values are determined from the ring gear/sun gear tooth ratios of the planetary gearsets 520, 530, and 540, as given in FIG. 12 by the values R1/S1, R2/S2, and R3/S3, respectively.

Those skilled in the art will recognize that the numerical value of the reverse speed ratio is determined by the ring gear/sun gear tooth ratios of the planetary gearsets 520 and 540. The numerical value of the first forward speed ratio is determined by the ring gear/sun gear tooth ratio of the planetary gearset 520. The numerical values of the second forward speed ratio and the sixth forward speed ratio are determined by the ring gear/sun gear tooth ratios of the planetary gearsets 520 and 530. The numerical values of the third forward speed ratio and the fifth forward speed ratio are determined by the ring gear/sun gear tooth ratios of all three planetary gearsets 520, 530, and 540. The numerical of the fourth forward speed ratio is one.

The chart of FIG. 12 provides an example of the ratio steps between the adjacent forward speed ratios, as well as between the reverse speed ratio and the first forward speed ratio, when the given numerical values of the speed ratios are utilized.

Figures 13, 14:
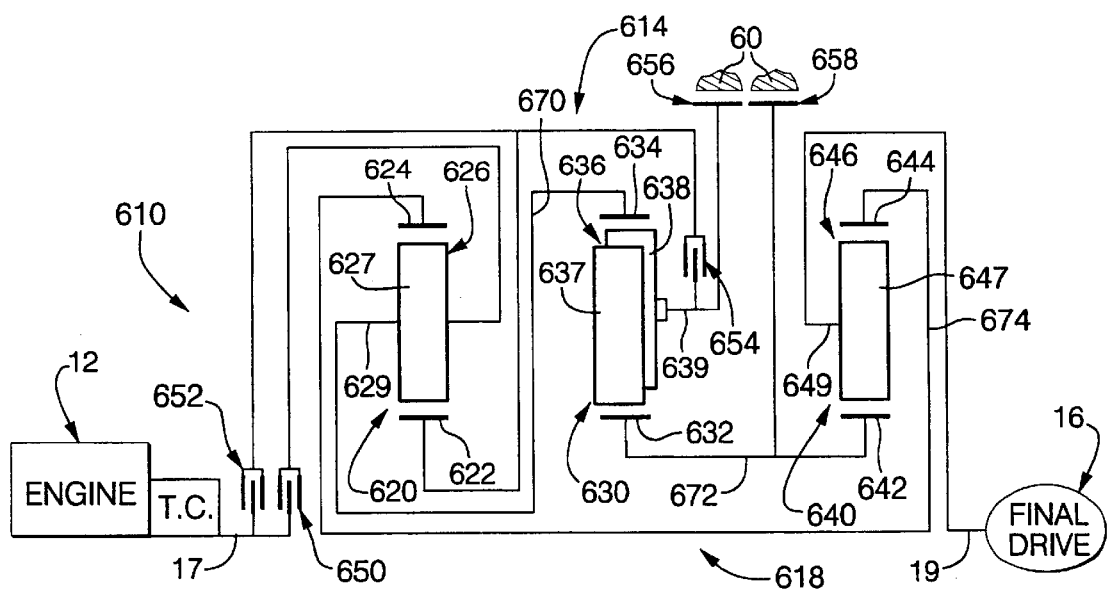
FIG. 13 is a schematic representation of a powertrain having another of the family members incorporating another embodiment of the present invention.
FIG. 14 is a truth table and chart depicting some of the operating characteristics of the planetary arrangement shown in FIG. 13.

A powertrain 610, shown in FIG. 13, includes the engine and torque converter 12, a planetary transmission 614, and the final drive mechanism 16. The planetary transmission 614 includes the input shaft 17, a planetary gear arrangement 618, and the output shaft 19. The planetary gear arrangement 618 includes three simple planetary gearsets 620, 630, and 640, and five torque-transmitting mechanisms 650, 652, 654, 656, and 658. The torque-transmitting mechanisms 650, 652, and 654 are rotating type torque-transmitting mechanisms, and the torque-transmitting mechanisms 656 and 658 are stationary type torque-transmitting mechanisms. The planetary gearsets 620 and 640 are simple planetary gearsets and the planetary gearset 630 is a compound planetary gearset.

The planetary gearset 620 includes a sun gear member 622, a ring gear member 624, and a planet carrier assembly member 626. The planet carrier assembly member 626 includes a plurality of pinion gears 627 that are rotatably mounted on a planet carrier 629 and disposed in meshing relationship with the sun gear member 622 and the ring gear member 624.

The planetary gearset 630 includes a sun gear member 632, a ring gear member 634, and a planet carrier assembly member 636. The planet carrier assembly member 636 consists of a plurality of pairs of meshing pinion gears 637 and 638 that are rotatably mounted on a planet carrier 639 and disposed in meshing relationship with the sun gear member 632 and the ring gear member 634, respectively.

The planetary gearset 640 includes a sun gear member 642, a ring gear member 644, and a planet carrier assembly member 646. The planet carrier assembly member 646 includes a plurality of pinion gears 647 that are rotatable mounted on a planet carrier 649 and disposed in meshing relationship with the sun gear member 642 and the ring gear member 644.

The torque-transmitting mechanisms are engaged in combinations of three, as shown in the truth table of FIG. 14, to provide a reverse speed ratio and six forward speed ratios through the planetary gear arrangement 618 between the input shaft 17 and the output shaft 19. The truth table also provides a numerical example for the speed ratios that can be utilized with the planetary gear arrangement 618. These numerical values are determined utilizing the ring gear/sun gear tooth ratios of the planetary gearsets 620, 630, and 640, as given by the values R1/S1, R2/S2, and R3/S3, respectively.

Those skilled in the art will recognized that the reverse speed ratio is determined by the ring gear/sun gear tooth ratios of the planetary gearsets 620 and 640. The first, second, and sixth forward speed ratios are each determined utilizing the ring gear/sun gear tooth ratios of all three planetary gearsets 620, 630, and 640. The third forward speed ratio has a numerical value determined by ring gear/sun gear tooth ratio of the planetary gearset 640. The fourth forward speed ratio is a direct drive having a numerical value of one. The fifth forward speed ratio has a numerical value determined by the ring gear/sun gear tooth ratios of the planetary gearsets 630 and 640.

Also given in FIG. 14 is a chart of the ratio steps between adjacent forward speed ratios as well as the step between the reverse and first forward speed ratio. These steps between adjacent forward speed ratios in both the single step and double step shift sequence are of the single transition interchange variety.

Figures 15, 16:
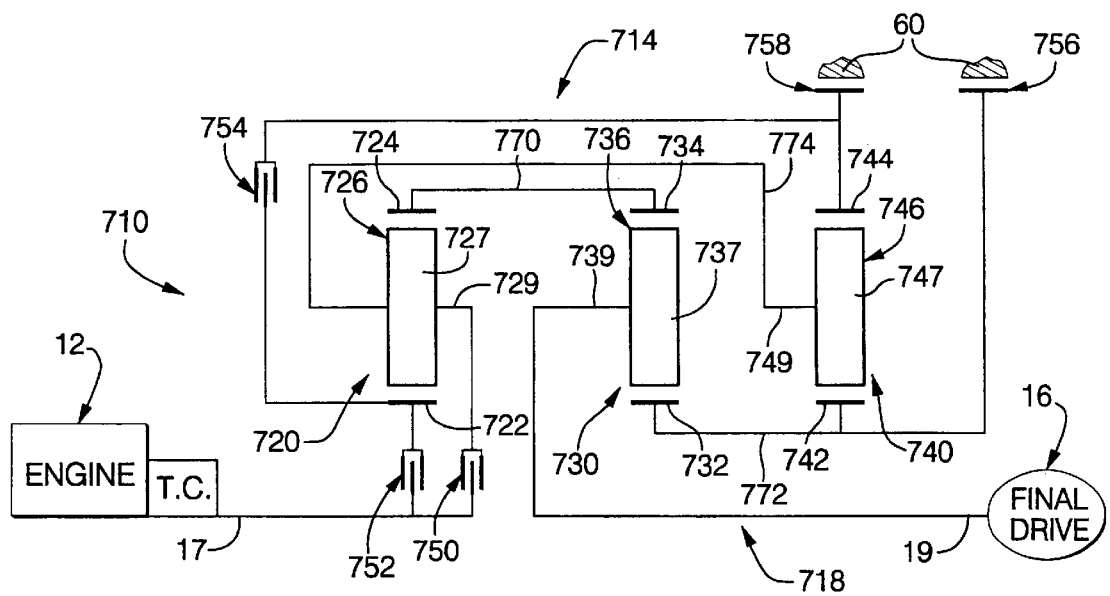
FIG. 15 is a schematic representation of a powertrain having another of the family members incorporating another embodiment of the present invention.
FIG. 16 is a truth table and chart depicting some of the operating characteristics of the planetary arrangement shown in FIG. 15.

A powertrain 710, shown in FIG. 15, includes the engine and torque converter 12, a planetary transmission 714, and the final drive mechanism 16. The planetary transmission 714 includes the input shaft 17, a planetary gear arrangement 718, and the output shaft 19. The planetary gear arrangement 718 includes three simple planetary gearsets 720, 730, and 740, and five torque-transmitting mechanisms 750, 752, 754, 756, and 758. The torque-transmitting mechanisms 750, 752, and 754 are rotating type torque-transmitting mechanisms, and the torque-transmitting mechanisms 756 and 758 are stationary type torque-transmitting mechanisms.

The planetary gearset 720 includes a sun gear member 722, a ring gear member 724, and a planet carrier assembly member 726. The planet carrier assembly member 726 includes a plurality of pinion gears 727 that are rotatably mounted on a planet carrier 729 and disposed in meshing relationship with the sun gear member 722 and the ring gear member 724.

The planetary gearset 730 includes a sun gear member 732, a ring gear member 734, and a planet carrier assembly member 736. The planet carrier assembly member 736 includes a plurality of pinion gears 737 that are rotatably mounted on a planet carrier 739 and disposed in meshing relationship with the sun gear member 732 and the ring gear member 734.

The planetary gearset 740 includes a sun gear member 742, a ring gear member 744, and a planet carrier assembly member 746. The planet carrier assembly member 746 includes a plurality of pinion gears 747 that are rotatable mounted on a planet carrier 749 and disposed in meshing relationship with the sun gear member 742 and the ring gear member 744.

The ring gear members 724 and 734 are continuously interconnected with an interconnecting member 770. The sun gear members 732 and 742 are continuously interconnected by an interconnecting member 772, which is selectively connectible with the transmission housing 60 through the torque-transmitting mechanism 756. The planet carrier assembly member 726 and planet carrier assembly member 746 are continuously interconnected by an interconnecting member 774. The planet carrier assembly member 736 is continuously connected with the output shaft 19. The input shaft 17 is selectively connectible with the interconnecting member 774 through the torque-transmitting mechanism 750, and selectively connectible with the sun gear member 722 through the torque-transmitting mechanism 752. The sun gear member 722 is selectively connectible with the ring gear member 744 through the torque-transmitting mechanism 754. The ring gear member 744 is selectively connectible with the transmission housing 60 through the torque-transmitting mechanism 758. The sun gear member 722 and ring gear member 744 are noncontinuously interconnected members of their respective planetary gearsets 720 and 740.

The torque-transmitting mechanisms are engaged in combinations of three, as shown in the truth table of FIG. 16, to provide six forward speed ratios and one reverse speed ratio through the planetary gear arrangement 718 between the input shaft 17 and the output shaft 19. The truth table of FIG. 16 also provides an example of the numerical values for the speed ratios which are determined utilizing the ring gear/sun gear tooth ratios of the planetary gearsets 720, 730, and 740, as given in the table of FIG. 16 as values R1/S1, R2/S2, and R3/S3, respectively.

Those skilled in the art will recognize that numerical value of the reverse speed ratio is determined by the ring gear/sun gear tooth ratios of the planetary gearsets 720 and 730. The numerical values of the first, second, and sixth forward speed ratios are determined utilizing the ring gear/sun gear tooth ratios of all three planetary gearsets 720, 730, and 740. The third forward speed ratio has a numerical value determined utilizing the ring gear/sun gear tooth ratio of the planetary gearset 730. The numerical value of the fourth forward speed ratio is one. The numerical value of the fifth forward speed ratio is determined utilizing the ring gear/sun gear tooth ratios of the planetary gearsets 730 and 740.

The truth table of FIG. 16 makes it evident that the single step forward interchanges as well as the double step forward interchanges are all of the single transition variety. The ratio interchange from reverse-to-forward is also a single step type shift in that only a single interchange is needed; namely, the torque-transmitting mechanisms 754 and 758. The chart in FIG. 16 provides numerical values for the ratio steps between adjacent forward speed ratios, as well as between the reverse and first forward speed ratio, when the numerical speed ratios given in the truth table are employed.

Figures 17, 18:
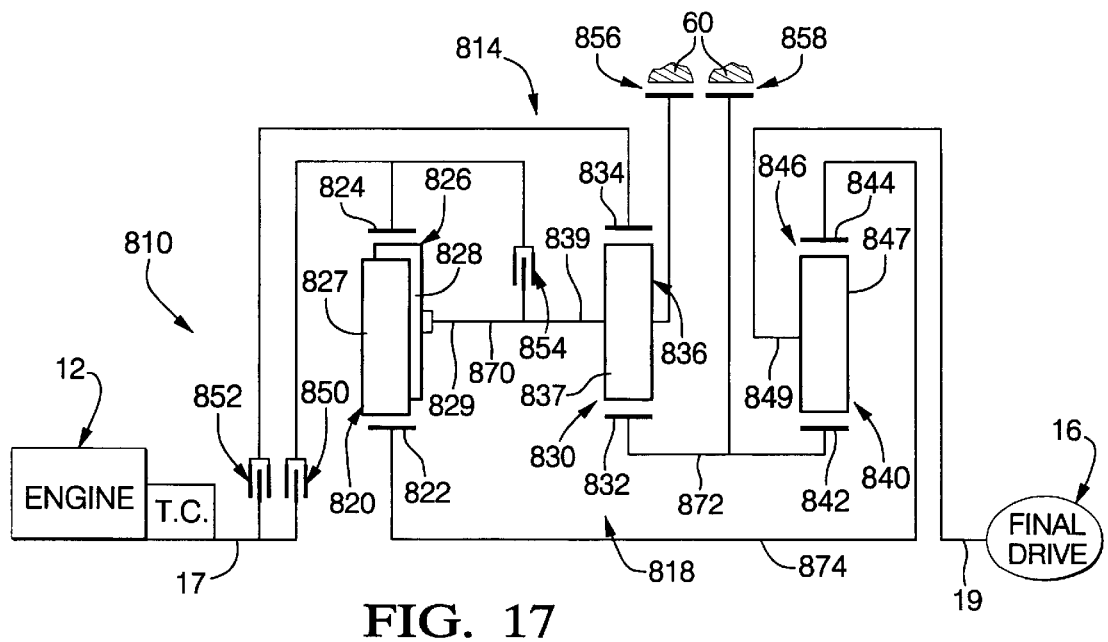
FIG. 17 is a schematic representation of a powertrain having another of the family members incorporating another embodiment of the present invention.
FIG. 18 is a truth table and chart depicting some of the operating characteristics of the planetary arrangement shown in FIG. 17.

A powertrain 810, shown in FIG. 17, includes the engine and torque converter 12, a planetary transmission 814, and the final drive mechanism 16. The planetary transmission 814 includes the input shaft 17, a planetary gear arrangement 818, and the output shaft 19. The planetary gear arrangement 818 includes three planetary gearsets 820, 830, and 840. The planetary gearset 820 is a compound (double pinion) planetary gearset while the planetary gearsets 830 and 840 are both of the simple type planetary gearset. The planetary gear arrangement 818 also includes five torque-transmitting mechanisms 850, 852, 854, 856, and 858. The torque-transmitting mechanisms 850, 852, and 854 are rotating type torque-transmitting mechanisms, and the torque-transmitting mechanisms 856 and 858 are stationary type torque-transmitting mechanisms.

The planetary gearset 820 includes a sun gear member 822, a ring gear member 824, and a planet carrier assembly member 826. The planet carrier assembly member 826 includes a plurality of pairs of intermeshing pinion gears 827 and 828 that are rotatably mounted on a planet carrier 829 and disposed in meshing relationship with the sun gear member 822 and the ring gear member 824, respectively.

The planetary gearset 830 includes a sun gear member 832, a ring gear member 834, and a planet carrier assembly member 836. The planet carrier assembly member 836 includes a plurality of pinion gears 837 that are rotatably mounted on a planet carrier 839 and disposed in meshing relationship with the sun gear member 832 and the ring gear member 834.

The planetary gearset 840 includes a sun gear member 842, a ring gear member 844, and a planet carrier assembly member 846. The planet carrier assembly -member 846 includes a plurality of pinion gears 847 that are rotatably mounted on a planet carrier 849 and disposed in meshing relationship with the sun gear member 842 and the ring gear member 844.

The planet carrier assembly member 826 and the planet carrier assembly member 836 are continuously interconnected by an interconnecting member 870, which is selectively connectible with the ring gear member 824 through the torque-transmitting mechanism 854. The sun gear members 832 and 842 are continuously interconnected by an interconnecting member 872, which is selectively connectible with the transmission housing 60 through the torque-transmitting mechanism 858. The output shaft 19 is continuously connected with the planet carrier assembly member 846. The input shaft 17 is selectively connectible with the ring gear member 834 through the torque-transmitting mechanism 852, and selectively connectible with the ring gear member 824 through the torque-transmitting mechanism 850. The interconnecting member 870 is selectively connectible with the transmission housing 60 through the torque-transmitting mechanism 856. The ring gear members 824 and 834 are noncontinuously connected members of their respective planetary gearsets 820 and 830.

The torque-transmitting mechanisms are engaged in combinations of three, as shown in the truth table of FIG. 18, to establish a reverse speed ratio and six forward speed ratios between the input shaft 17 and the output shaft 19 through the planetary gear arrangement 818. Also given in the truth table is an example of the numerical ratios that can be attained with the planetary gear arrangement 818 when utilizing the ring gear/sun gear tooth ratios of the planetary gearsets 820, 830, and 840, which are given in FIG. 18 as the ratios R1/S1, R2/S2, and R3/S3, respectively.

Those skilled in the art will recognize that the numerical values for the reverse speed ratio and the first forward speed ratio are determined utilizing the ring gear/sun gear tooth ratios of the planetary gearsets 830 and 840. The numerical value for the second forward speed ratio is determined utilizing the ring gear/sun gear tooth ratio of the planetary gearset 840. The numerical value of the third forward speed ratio is one. The numerical values for the fourth forward speed ratio and the fifth forward speed ratio are each determined utilizing the ring gear/sun gear tooth ratios of the planetary gearsets 820, 830, and 840. The numerical value for the sixth forward speed ratio is determined utilizing the ring gear/sun gear tooth ratios of the planetary gearsets 820 and 840.

Also given in FIG. 18 is a chart which sets forth the ratio steps between adjacent forward speed ratios, as well as between the reverse and first forward speed ratio, and the numerical values for the speed ratios as shown in the truth table are employed.

What is claimed is:

1. A family of six speed transmissions having a plurality of family members comprising:
   an input shaft;
   an output shaft;
   a transmission housing;
   a planetary gear arrangement comprising first, second, and third planetary gear sets, each planetary gear set having first, second, and third members, a first interconnecting member continuously interconnecting said first members of said first and second planetary gear set, a second interconnecting member continuously interconnecting said second member of said second planetary gear set and said first member of said third planetary gear set, a third interconnecting member continuously interconnecting said second member of said first planetary gear set and said second member of said third planetary gear set, said output shaft being continuously interconnected with any one of a group consisting of said third members of said planetary gear sets, and at least two of said members of said planetary gear sets being non-continuously interconnected,
   a first selectively engageable torque transmitting mechanism being selectively interconnectable between said input shaft and with at least one member of one of said planetary gear sets;
   a second selectively engageable torque transmitting mechanism being selectively interconnectable between said input shaft and any one of a group consisting of said non-continuously interconnected members, and said interconnecting members;
   a third selectively engageable torque transmitting mechanism being selectively interconnectable between any one of a group consisting of a member of said first, second, and third planetary gear sets with any one of a group consisting of said input shaft, said output shaft, and another member of said first, second, and third planetary gear sets;
   a fourth selectively engageable torque transmitting mechanism being selectively interconnectable between said transmission housing and at least one member of said first, second, and third planetary gear sets;
   a fifth selectively engageable torque transmitting mechanism selectively interconnectable between said transmission housing and any one of a group consisting of a member of said second planetary gear set, a member of said third planetary gear set, said first interconnecting member, said second interconnecting, and said third interconnecting member; and
   said torque transmitting mechanisms being selectively engaged in combinations of three to establish at least six forward speed ratios and one reverse speed ratio between said input shaft and said output shaft through said planetary gear arrangement.

2. The family of six-speed transmissions defined in claim 1 further comprising:
   each of said first members of each of said planetary gear sets being any one of a first group consisting of a sun gear member, a ring gear member, and a planet carrier assembly member;
   each of said second members of each of said planetary gear sets being one of said first group that is not said first member; and
   each of said third members of each of said planetary gear sets being one of said first group that is not one of said first member and said second member.

3. A family of six-speed transmissions having a plurality of family members comprising:
   an input shaft means for delivering power to said transmission;
   an output shaft means for delivering power from said transmission;
   a transmission housing;
   a planetary gear arrangement including first, second, and third planetary gear sets, each planetary gear set having a first member, a second member, and a third member, a first interconnecting member continuously interconnecting said first member of said first planetary gear set with said first member of said second planetary gear set, a second interconnecting member continuously interconnecting said second member of said second planetary gear set with said first member of said third planetary gear set, a third interconnecting member continuously interconnecting said second member of said first planetary gear set with said second member of said third planetary gear set, and said output shaft means being continuously interconnected with at least one member of one of said planetary gear sets;
   a first selectively engageable brake selectively interconnecting said transmission housing with a member of said first planetary gear set or said second planetary gear set;
   a second selectively engageable brake selectively interconnecting said transmission housing with at least one member of said second planetary gear set or said third planetary gear set;
   a first selectively engageable clutch selectively interconnecting said input shaft means with either a member of said first planetary gear set, a member of said second planetary gear set, or a member of said third planetary gear set;
   a second selectively engageable clutch selectively interconnecting said input shaft means with either a member of said first planetary gear set, a member of said second planetary gear set, a member of said third planetary gear set, said first interconnecting member, said second interconnecting member, or said third interconnecting member;

a third selectively engageable clutch selectively interconnecting said a member of one of said first, second and third planetary gear sets with either said input shaft means, said output shaft means, or another member of one of said planetary gear sets; and said clutches and brakes being selectively engaged in combinations of three to establish at least six forward speed ratios and one reverse speed ratio in said planetary gear arrangement between said input shaft and said output shaft.

4. A family of six-speed transmissions having a plurality of family members comprising:

an input shaft;

an output shaft;

a transmission housing;

a planetary gear arrangement comprising a first planetary gear set, a second planetary gear set, and a third planetary gear set, each planetary gear set having a first member, a second member, and a third member, a first interconnecting member continuously interconnecting said first members of said first and second planetary gear sets, a second interconnecting member continuously interconnecting said second member of said second planetary gear set and said first member of said third planetary gear set, a third interconnecting member continuously interconnecting said second members of said first and third planetary gear sets, said output shaft being continuously interconnected with at least one member of said planetary gear sets, and five selectively engageable torque transmitting mechanisms;

a first of said torque transmitting mechanisms being selectively interconnectable between said input shaft and any one of a first group consisting of said first interconnecting member, said second interconnecting member, said third interconnecting member, said third member of said first planetary gear set, and said third member of said second planetary gear set;

a second of said torque transmitting mechanisms being selectively interconnectable between said input shaft and any one of a second group consisting of said third member of said first planetary gear set, said third member of said second planetary gear set, and said third member of said third planetary gear set;

a third of said torque transmitting mechanisms being selectively interconnectable between any selected one of a third group consisting of said third member of said first planetary gear set and said third member of said second planetary gear set and any selected one of a fourth group consisting of said third member of said second planetary gear set, said third member of said third planetary gear set, said first interconnecting member, said second interconnecting member, and said third interconnecting member that is not the selected one of the third group;

a fourth of said torque transmitting mechanisms being selectively interconnectable between said transmission housing and any one of a fifth group consisting of said third member of said second planetary gear set, said third member of said third planetary gear set, and said first interconnecting member;

a fifth of said torque transmitting mechanisms being selectively interconnectable between said transmission housing and any one of a sixth group consisting of said second interconnecting member and said third interconnecting member; and said five torque transmitting mechanisms being engaged in combinations of three to establish at least six forward speed ratios and one reverse speed ratio in said planetary gear arrangement between said input shaft and said output shaft.

5. The family of six-speed transmissions defined in claim 4 further wherein:

each of said planetary gear sets is any one of a sixth group consisting of a simple planetary gear set and a compound planetary gear set.

6. The family of six-speed transmissions defined in claim 5 further comprising:

each of said first members of each of said planetary gear sets being any one of a seventh group consisting of a sun gear member, a ring gear member, and a planet carrier assembly member;

each of said second members of each of said planetary gear sets being one of said seventh group that is not said first member; and each of said third members of each of said planetary gear sets being one of said seventh group that is not one of said first member and said second member.

7. A family of multi-speed transmissions having a plurality of family members comprising:

an input shaft;

an output shaft;

a transmission housing;

a planetary gear arrangement comprising a first planetary gear set, a second planetary gear set, and a third planetary gear set, each planetary gear set having a first member, a second member, and a third member, a first interconnecting member continuously interconnecting said first members of said first and second planetary gear sets, a second interconnecting member continuously interconnecting said second member of said second planetary gear set and said first member of said third planetary gear set, a third interconnecting member continuously interconnecting said second members of said first and third planetary gear sets, and said output shaft being continuously interconnected with at least one member of said planetary gear sets;

five selectively engageable torque transmitting mechanisms connecting members of said planetary gear sets with the transmission housing, input shaft or other members of the planetary gear sets;

said five selectively engageable torque transmitting mechanisms being engaged in combinations of three to establish at least six forward speed ratios and one reverse speed ratio between said input shaft and said output shaft.

* * * * *